(12) United States Patent
Canfield

(10) Patent No.: US 6,677,853 B1
(45) Date of Patent: Jan. 13, 2004

(54) ANIMAL DETERRENT USING VEHICLE HORN

(76) Inventor: Jerrid Scott Canfield, N9539 Hwy. J, Blanchardville, WI (US) 53516

( * ) Notice: Subject to any disclaimer, the term of this patent is extended or adjusted under 35 U.S.C. 154(b) by 0 days.

(21) Appl. No.: 09/935,382

(22) Filed: Aug. 22, 2001

(51) Int. Cl.[7] ................................................ G08B 3/10
(52) U.S. Cl. ........................ 340/384.2; 340/425.5; 340/426; 340/428; 340/384.1; 340/468; 340/471; 340/573.1; 340/573.2
(58) Field of Search .................... 340/384.2, 425.5, 340/426, 428, 384.1, 468, 471, 5.1, 5.2, 573.1, 573.2

(56) References Cited

U.S. PATENT DOCUMENTS

| | | | | |
|---|---|---|---|---|
| 3,315,249 A | * | 4/1967 | Clements | 340/329 |
| 3,516,384 A | * | 6/1970 | Will | 340/384.2 |
| 3,748,494 A | * | 7/1973 | Nine | 340/428 |
| 4,150,637 A | * | 4/1979 | Penick | 280/727 |
| 4,219,799 A | * | 8/1980 | Weber | 340/425.5 |
| 4,797,671 A | * | 1/1989 | Toal, Jr. | 340/825.49 |
| 4,998,091 A | * | 3/1991 | Rezmer | 340/425.5 |
| 5,278,537 A | * | 1/1994 | Carlo et al. | 340/384.1 |
| 5,418,518 A | | 5/1995 | Schenken et al. | |
| 5,515,026 A | | 5/1996 | Ewert | |
| 5,557,257 A | * | 9/1996 | Gieffers | 340/474 |
| 5,602,523 A | | 2/1997 | Turchioe et al. | |
| 5,832,431 A | * | 11/1998 | Severson et al. | 704/258 |
| 5,942,815 A | * | 8/1999 | Newman et al. | 340/384.73 |
| 5,965,952 A | * | 10/1999 | Podoloff et al. | 307/10.1 |
| 5,969,593 A | * | 10/1999 | Will | 340/384.2 |
| 6,049,269 A | * | 4/2000 | Byrd et al. | 340/426 |
| 6,130,605 A | * | 10/2000 | Flick | 340/426 |

FOREIGN PATENT DOCUMENTS

GB        1118407   *  7/1968   .................. 239/431

* cited by examiner

Primary Examiner—Jeffery Hofsass
Assistant Examiner—Daniel Pfevil
(74) Attorney, Agent, or Firm—Craig A. Fieschko, Esq.; DeWitt Ross & Stevens S.C.

(57) ABSTRACT

This disclosure concerns an invention used to deter auto collisions with animals, and more specifically to allow standard automobile horn to be altered in a manner such that the noise alerts animals, particularly deer, to the presence of an approaching vehicle. A timer/oscillator is selectively connectable between the vehicle horn actuator (e.g., the button on the steering wheel of the vehicle) and the vehicle horn. When the timer is connected between the horn actuator and the horn, a continuous input to the horn actuator is converted to an intermittent horn output (preferably cycling between 2–20 Hz), this intermittent horn output being synchronized with the timer pulses. Such cycling of the horn causes a flight response in animals when sounded in their vicinity.

13 Claims, 2 Drawing Sheets

ANIMAL DETERRENT USING VEHICLE HORN

FIELD OF THE INVENTION

This disclosure concerns an invention used to deter motor vehicle collisions with animals, and more specifically to provide a means of altering a standard motor vehicle horn in a manner such that the noise alerts animals, particularly deer, to the presence of an approaching vehicle.

BACKGROUND OF THE INVENTION

As humans and animals compete for space, and as roads and development continue to be created in former wilderness areas, vehicle collisions with large animals such as deer, moose, elk, and the like, are becoming increasingly common. Vehicle-animal auto accidents have become problematic in many regions of the U.S., and often result in the loss of human and animal life. Additionally, these collisions, and the damage to vehicles and property that result, place a large financial burden on individual drivers, and the transportation industry as a whole.

In response to the problem of vehicle-animal collisions, numerous warning devices for avoiding highway collisions with animals are currently available. One type of device, as exemplified by the device of U.S. Pat. No. 4,150,637, works on the principle of ultrasonic wave generation and is commonly known as a "deer whistle." The device is attached to a vehicle's forward bumper, usually by means of an adhesive strip. As the vehicle travels down a roadway in excess of 30 miles per hour, the resultant air movement through the device is said to generate ultrasonic waves. The ultrasonic waves purportedly deter deer from entering the roadway, thereby preventing car/deer collisions. However, the efficacy of deer whistles has been called into question. Initially, some studies have indicated that the animals that are most prone to vehicle-animal collisions do not hear sounds over the range of ultrasonic frequencies at which the deer whistles operate. There are also serious questions as to whether the deer whistles produce ultrasonic sound of appreciable amplitude over the standard range of vehicle operating speeds. Further, the whistles are often rendered inoperative by rain, snow, road debris, and insects clogging the mechanism. Some electrically powered ultrasonic generators (as in U.S. Pat. Nos. 3,516,384, 4,998,091, and 5,278,537) can overcome some of the aforementioned problems, but they are still reliant on ultrasonic sound to move animals away from the vehicle, and such reliance may be displaced. Thus, ultrasonic sound generators may not only be ineffective as an animal deterrent, they may also be damaging in that they cause a false sense of security in the drivers that use them; the drivers may become more dependent upon the whistles and less apt to slow down and be watchful for hazards.

Another device, illustrated in U.S. Pat. No. 5,832,431, uses prerecorded sounds such as barking dogs, shotgun blasts, etc., broadcast through a speaker attached to the vehicle as it moves down the road. Installation of such a system would often be difficult and expensive, and coherent sounds which are recognizable (but uncommon in the driving environment, such as gun blasts) may pose a safety hazard because they are bothersome and surprising to other drivers.

There is also a need for a system that can be easily incorporated into motor vehicle electronics. These electronics systems need to operate consistently in extreme heat, cold, moisture, and dryness, often with "dirty" power supplies (i.e., with non-steady current/voltage conditions and potentially disabling transient "spikes"), and inconsistent environmental conditions.

DETAILED DESCRIPTION OF PREFERRED EMBODIMENTS OF THE INVENTION

Figure 1:
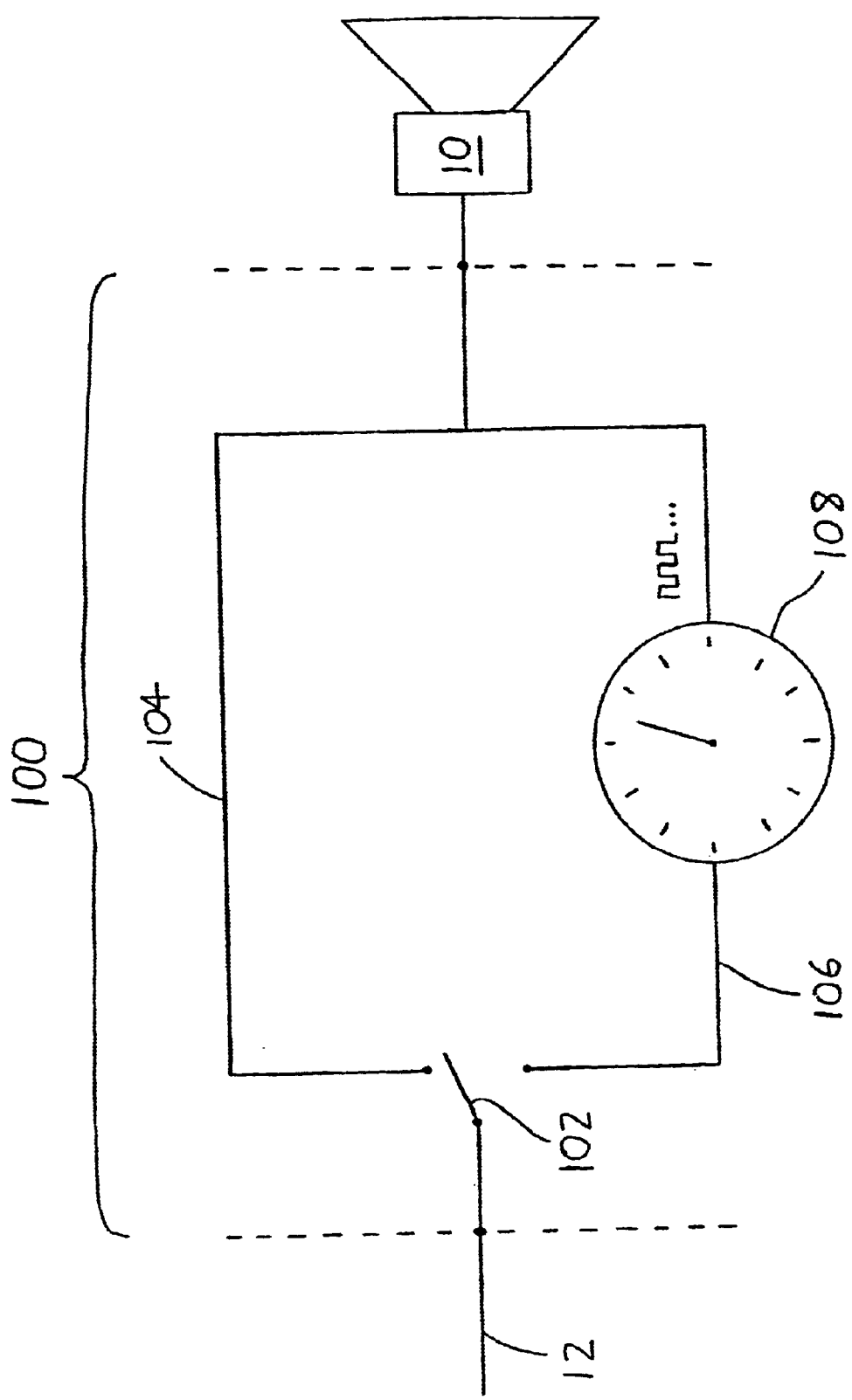
FIG. 1 schematically illustrates a basic embodiment of the animal deterrent device installed within a motor vehicle horn circuit.

The invention, which is defined by the claims set out at the end of this disclosure is intended to solve at least some of the problems noted previously. Initially referring to FIG. 1, a basic version of the invention is schematically illustrated. The animal deterrent device 100 is intended to be installed into a preexisting motor vehicle horn circuit system between the horn 10 and the horn input 12 as an aftermarket product, though it may instead be manufactured as a unit with the horn circuit. A switch 102 allows the animal deterrent device 100 to be switched between a normal mode along line 104, wherein the horn 10 operates in standard fashion (the horn noise is continuous and contemporaneous with the operator's activating the horn control), or an activated mode along line 106, wherein the horn input is modified by a timer 108—an oscillator or other device capable of generating a discretized output from a continuous input—so long as the operator activates the horn control. Thus, in active mode, the otherwise continuous horn noise is discretized into a train of intermittent horn pulses: when the driver activates the horn 10 when the animal deterrent device 100 is in active mode, the animal deterrent device 100 cycles the horn 10 on and off, preferably in a range of 2–20 times per second, until the driver releases the horn.

Within the aforementioned frequency range of 2–20 pulses per second, the range surrounding 8 Hz is particularly preferred. It has been found that a rapid, staccato cycling of the horn, when sounded in the vicinity of a deer or other animal, causes a very pronounced flight response. It is believed that animals are more capable of determining the location of a sound if they hear it in an alternating on-off form (as opposed to a continuous form, as with a steady continuous blast of the horn). The ability to locate the sound deters a "freezing" response by the animal and better enables a decision to flee.

The animal deterrent device 100 solves several problems with prior animal deterrents. It is inexpensive and easy to install because it works through the preexisting horn system in an automobile. Its usage is not as startling or disturbing to other drivers because it sounds like a commonly-encountered roadway noise to humans, but it is still effective in scaring animals away because its intermittent blasts of the horn allow the animal to more effectively locate and flee from the source of noise. Furthermore, the device is not constantly on, and thus it requires the driver to remain vigilant to the hazards in or near the roadway, benefitting road safety as a whole. It is also resistant to damage or performance diminution by rain, ice, snow, insects, or other road debris.

Figure 2:
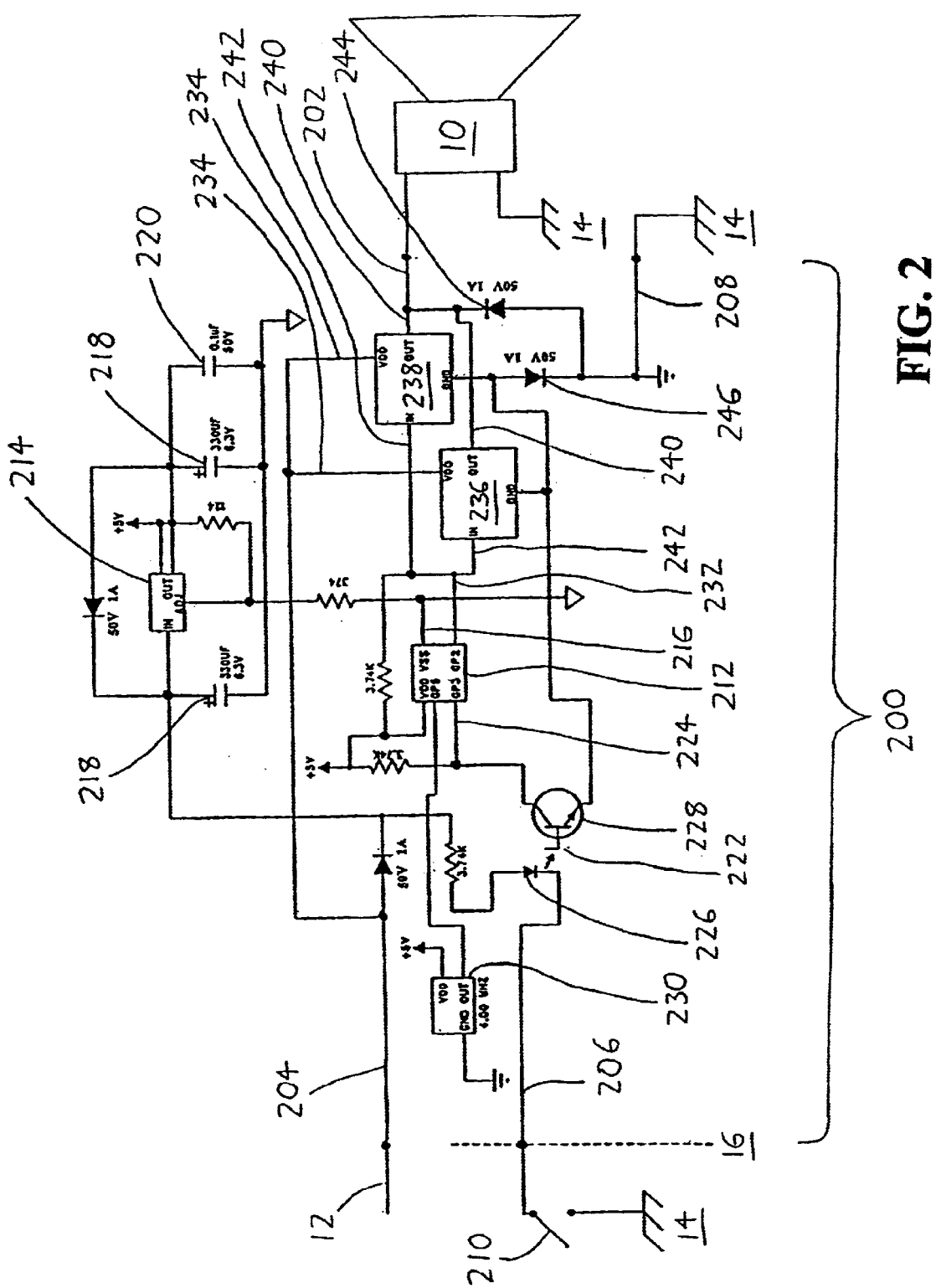
FIG. 2 schematically illustrates a preferred version of the animal deterrent device installed within a motor vehicle horn circuit.

A specific preferred version of the animal deterrent device is then illustrated in FIG. 2 at the reference numeral 200. The animal deterrent device 200 is provided as a solid-state timer circuit situated in a housing (not illustrated in the drawings), with the housing being an aftermarket component intended for easy installation into the horn circuit of a motor vehicle. The housing of the animal deterrent device 200 is preferably manufactured of plastic and measures approximately 3×2×1 inches. A description of the internal components of the animal deterrent device 200 (and the installation of the device 200 in a standard motor vehicle horn circuit) will now be provided, it being noted that all of the components can be purchased from any standard electronics component supplier, one being DIGI-KEY Inc. (Thief River Falls, Minn., USA).

Four leads extend from the housing of the animal deterrent device 200 for easy connection to the circuit of a motor vehicle horn 10, an output lead 202, an input lead 204, a control lead 206, and a ground lead 208. To initiate installation, the power lead 12 for the horn 10 is separated, and the animal deterrent device 200 is introduced with output lead 202 connected to the horn 10 and input lead 204 connected to the power lead 12. Control lead 206 extends from the animal deterrent device 200 to the vehicle chassis 14, and includes a control switch 210 allowing the device 200 to be enabled or disabled as the user chooses. Preferably, the animal deterrent device 200 is mounted in the engine compartment in a low temperature area, and control lead 206 is extended through the vehicle firewall 16 to the control switch 210, which is provided on the dashboard or in another area that is easily accessible to the vehicle's driver. Finally, ground lead 208 is provided from the animal deterrent device 200 for attachment to the vehicle chassis 14.

The animal deterrent device 200 can operate in two modes, a normal mode wherein the horn 10 operates normally (i.e., the horn 10 sounds so long as the operator depresses the horn 10), and an activated mode wherein the horn 10 sounds on and off periodically at a rate set in the animal deterrent device 200 so long as the horn 10 is depressed. This cycling rate is factory-set in a microcontroller 212 (IC Microcontroller, Microchip Technology Inc., Chandler, Ariz.). The mode is selected by the control switch 210; when closed, the animal deterrent device 200 is in activated mode, whereas opening the control switch 210 places the control switch 210 in normal mode.

When the animal deterrent device 200 is in active mode (switch 210 is closed) and the driver presses the horn 10, the input lead 204 is energized. A voltage regulator 214 (Analog Regulator SOT-223, National Semiconductor, Santa Clara, Calif.) is provided, if necessary, to adjust the voltage to a proper level for operation of the microcontroller 212. If the aforementioned microcontroller 212 is used, the voltage regulator 214 drops the 12 V supplied from horn power lead 12/input lead 204 to the 5 V level required by the microcontroller supply input 216. Capacitors 218 and 220 are also used to condition current flow to the voltage regulator 214 so that the power supplied to the animal deterrent device 200 by the voltage regulator 214 will be "clean." Preferred capacitors 218 and 220 include electrolytic capacitors 218 (PCE 6.3V 2034CT-ND, Panasonic, Tokyo, Japan) and ceramic capacitor 220 (CAP1206 0.1 $\mu$F 10%, Panasonic, Tokyo, Japan).

An optocoupler interface 222 (QT Optoelectronics 4N27, Fairchild Semiconductor, South Portland, Me.) is also provided for input protection to the microcontroller 212 at its control input 224. Without this protection, microcontroller input 224 would be susceptible to input noise and voltage transients that normally occur in an automotive electric system. When control lead 206 is connected to the vehicle chassis ground 14 by closing the control switch 210, the optocoupler diode 226 conducts and turns on its common emitter connected bipolar transistor 228, thereby effectively connecting microcontroller control input 224 to the vehicle chassis ground 14. The microcontroller 212 monitors control input 224 and when it is at ground, the microcontroller 212 is set to active mode. In contrast, if the control switch 210 is open, the optocoupler diode 226 does not conduct and optocoupler transistor 228 is off, thereby setting control input 224 to 5 V and indicating to microcontroller 212 that the animal deterrent device 200 is in normal mode.

When the horn 10 is pressed, voltage regulator 214 provides 5 V to (negative) microcontroller supply input 216. The microcontroller 212 powers up and starts to execute firmware code. It initially starts up an internal timer which utilizes crystal 230, which oscillates at 4 MHz and provides the clock and time-base for the microcontroller 212, and it also configures microcontroller control input 224 and microcontroller control output 232. It then detects the current operating mode of the animal deterrent device 200 by examining the voltage on microcontroller control input 224; as previously noted, a low (ground) signal indicates active mode, whereas a high (5 V) signal indicates normal mode.

Activating the animal deterrent device 200 by pressing horn 10 will also provide current from input lead 204 to the positive supply inputs 234 of solid-state relays 236 and 238. The two relays 236 and 238 (Relay Solid State High Side 26V 13A VN05N, ST Microelectronics, Phoenix, Ariz.) are provided in parallel to allow higher current rating and a greater duty cycle, but if desired, a single relay could be used instead. The relays 236 and 238 are activated (relay supply inputs 234 are connected to relay outputs 240) by the microcontroller 212 driving their switching leads 242 to 5 V. The horn 10 will sound so long as the 12 V supply is maintained between relay supply inputs 234 and relay outputs 240.

Thus, if the horn 10 is depressed in normal mode (i.e., control switch 210 is open), the microcontroller 212 immediately activates relays 236 and 238, thus sounding the horn 10 until the operator releases it. When the operator releases the horn, the microcontroller 212 powers down and relays 236 and 212 are deactivated, thus removing power from the horn 10.

In contrast, if the horn 10 is depressed in active mode (i.e., control switch 210 is closed), the microcontroller 212 starts its internal timer to control the cycling of the horn 10. When a pulse is received from the timer (i.e., when the timer's horn off period ends and a horn on period begins), the microcontroller control output 232 signals the relay switching leads 242. The relay supply inputs 234 are thereby connected to the relay outputs 240 and the horn 10 is activated during each horn on period. This continues until the operator releases the horn 10. Since the microcontroller 212 continuously monitors the control switch 210, it is possible to switch between the normal and active modes while the horn 10 is activated.

Additional power supply protection of the animal deterrent device 200 and its components can be provided, e.g., by diodes 244 and 246. Diode 244 is used as a flyback diode and prevents the inductively stored current in the horn 10 from inducing a destructive high voltage across the relays 236 and 238. Diode 246 provides some protection from reverse battery connection to the animal deterrent device 200. Other diodes and/or other protective components can be inserted at various locations within the device 200 as desired.

All of the foregoing components are rated for the currents necessary to sound the horn. It is emphasized that the animal deterrent device 200 is merely a preferred version of the invention, and many of the foregoing components may be replaced by different components having the same functionality (e.g., the microcontroller and switch arrangement might be replaced by a suitable arrangement of relays in conjunction with an oscillator), and not all of the illustrated components are necessary (e.g., the current and voltage regulation/protection components might be eliminated). Apart from combining the different features of the animal deterrent devices 100 and 200 in varying ways, other modifications are also considered to be within the scope of the invention. Following is an exemplary list of such modifications.

First, the horn on time and horn off time may be collectively or independently programmed in the microcontroller 212 to allow longer or shorter durations of the horn on time and off time. As ail example, the horn on/off time may be set to 10 Hz, and the horn 10 may then be turned on and off 10 times per second (with 0.05 s horn on periods being spaced by 0.05 s horn off periods). As another example, horn on time may be set to 0.075 s and horn off time may be set to 0.025 s. The limits of the selected on/off times are dependent on the ability of the horn 10 to respond to the selected time.

Second, the horn on time and off time need not be factory programmed, but may instead be selected by the user, e.g., by rotating knobs supplied with the control switch 210 to select desired values.

Third, a hazard scanning detection system is added, which would automatically begin cycling the horn when a hazard is detected. As an example, if the brakes are suddenly and firmly depressed (as when an operator stomps on a brake in an emergency situation), the animal deterrent device 200 might activate the horn, and continue to activate it for a second or so after the brake is released.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A motor vehicle animal deterrent wherein a continuous input to a horn actuator is converted into a series of spaced inputs supplied to the vehicle horn, whereby the continuous input to the horn actuator is output from the vehicle horn as a series of spaced vehicle horn sounds occurring at a frequency between 2–20 Hz and wherein the vehicle horn actuator may also be selectively connected to the vehicle horn to output a continuous input to the horn actuator as a continuous vehicle horn sound from the vehicle horn.

2. The motor vehicle animal deterrent of claim 1 wherein the spaced vehicle horn sounds occur at a frequency between 5–12 Hz.

3. The motor vehicle animal deterrent of claim 1 wherein the spaced vehicle horn sounds occur at or substantially near 8 Hz.

4. The motor vehicle animal deterrent of claim 1 further comprising a timer interposed between the vehicle horn actuator and the vehicle horn, wherein the timer converts the continuous input to the horn actuator into the series of spaced inputs supplied to the vehicle horn.

5. The motor vehicle animal deterrent of claim 4 further comprising a control switch allowing selective connection of the horn actuator to the vehicle horn:
   a. with the timer interposed therebetween, or
   b. without the timer interposed therebetween.

6. The motor vehicle animal deterrent of claim 1 further comprising:
   a. spacing means for generating a discretized output from a continuous input, the spacing means receiving input from the vehicle horn actuator, and
   b. at least one relay communicating any discretized output from the spacing means to the vehicle horn.

7. The motor vehicle animal deterrent of claim 6 wherein the spacing means includes a timer.

8. The motor vehicle animal deterrent of claim 7 wherein the spacing means further includes a microcontroller selectively capable of communicating discretized output from the timer to the relay.

9. The motor vehicle animal deterrent of claim 1 wherein the series of spaced inputs is supplied to the horn at an at least substantially constant frequency.

10. A motor vehicle animal deterrent comprising:
    a. a vehicle horn,
    b. a vehicle horn actuator,
    c. a timer situated between the vehicle horn and the vehicle horn actuator, wherein the timer converts any continuous input to the horn actuator into a series of spaced inputs received by the vehicle horn, with any continuous input to the horn actuator thereby producing a series of vehicle horn sounds spaced with soundless periods, such series occurring at a frequency between 2–20 Hz;
    d. a switch allowing the timer to be selectively bypassed, thereby allowing a continuous input to the horn actuator to be provided as a continuous input supplied to the vehicle horn.

11. The motor vehicle animal deterrent of claim 10 wherein the series of vehicle horn sounds is emitted at an at least substantially constant frequency.

12. The motor vehicle animal deterrent of claim 10 wherein the series of vehicle horn sounds occurs at a frequency between 5–12 Hz.

13. The motor vehicle animal deterrent of claim 10 wherein the series of vehicle horn sounds occurs at or substantially near 8 Hz.

\* \* \* \* \*